United States Patent [19]

Collonia et al.

[11] 4,319,658
[45] Mar. 16, 1982

[54] DEVICE FOR THE CONTROL OF THE TRAVELING SPEED OF A MOTOR VEHICLE

[75] Inventors: Harald Collonia, Königstein; Arnold Mann, Bieber; Martin Haub, Steinbach, all of Fed. Rep. of Germany

[73] Assignee: VDO Adolf Schindling AG, Frankfurt am Main, Fed. Rep. of Germany

[21] Appl. No.: 966,297

[22] Filed: Dec. 4, 1978

[30] Foreign Application Priority Data

Dec. 7, 1977 [DE] Fed. Rep. of Germany ....... 2754439
Dec. 9, 1977 [DE] Fed. Rep. of Germany ....... 2754824
Mar. 17, 1978 [DE] Fed. Rep. of Germany ....... 2811633

[51] Int. Cl.³ .............................................. B60L 3/00
[52] U.S. Cl. .................................... 180/271; 123/340; 123/350; 123/361; 180/272; 180/281; 180/286
[58] Field of Search ............. 180/273, 286, 271, 272, 180/281, 282; 123/340, 341, 361, 350, 399, 395, 198 DB

[56] References Cited

U.S. PATENT DOCUMENTS

| 2,360,227 | 10/1944 | Hemphill | 180/286 X |
| 2,942,680 | 6/1960 | Miller et al. | 180/286 |
| 3,154,168 | 10/1964 | Wilmot | 180/286 X |
| 3,575,256 | 4/1971 | Jania et al. | 123/361 X |
| 3,700,996 | 10/1972 | Gutting | 123/361 X |
| 4,007,357 | 2/1977 | Yanagishima | 180/272 X |

FOREIGN PATENT DOCUMENTS

| 2042853 | 3/1972 | Fed. Rep. of Germany | 180/272 |
| 605274 | 7/1948 | United Kingdom | 180/286 |

*Primary Examiner*—Joseph F. Peters, Jr.
*Assistant Examiner*—D. W. Underwood
*Attorney, Agent, or Firm*—Martin A. Farber

[57] ABSTRACT

A device for the control of the traveling speed of a motor vehicle with a regulating member actuatable by the vehicle driver, the gas pedal emitting an electrical signal, the gas pedal being connected with the desired value input of an electrical controller, the output signal of which acts on a positioning actuator, the latter being coupled with the element, particularly the throttle valve, which influences the fuel-air mixture, the instantaneous setting position of the positioning actuator being transmitted as an electric signal to the actual value input of the controller. The actual value input or the desired value input of the controller is driven by a circuit which produces a signal for influencing the position of the throttle valve, which signal is dependent on at least one factor to be monitored.

19 Claims, 6 Drawing Figures

DEVICE FOR THE CONTROL OF THE TRAVELING SPEED OF A MOTOR VEHICLE

The invention relates to a device for the control of the traveling speed of a motor vehicle with a regulating member actuatable by the vehicle driver, the regulating member emitting an electrical signal, the regulating member being connected with the desired value input of an electrical controller, the output signal of which acts on a positioning actuator, the latter being coupled with the element, particularly the throttle valve, which influences the fuel-air mixture, the instantaneous setting position of the positioning actuator being transmitted as an electric signal to the actual value input of the controller.

In a device of this type, the gas pedal is coupled with an electric position indicator which feeds the desired value input of the controller with an electric signal which is dependent on the instantaneous position of the gas pedal. Another position indicator is coupled to the throttle valve and connected with the actual value input of the controller. A positioning actuator which is controlled by the controller acts on the throttle valve. Such an arrangement has considerable advantages in mounting or assembly compared to the known arrangements in which the gas pedal and the throttle valve are mechanically connected to each other, since merely one electrical connection line is to run between the regulating member and the throttle valve.

Generally the actuation of the regulating member by the driver and consequently the selection of the traveling speed not only is dependent on the traffic conditions or occurrences, the character of the road and other circumstances existing outside of the vehicle, but rather is also dependent on the specific vehicle values, such as oil temperature, the working order or condition of the brake system, the condition of the lighting system and other factors or quantitites. In certain cases moreover the vehicle basically should not be placed in movement, a traveling speed thus indeed cannot be selected, for example, with driving inability of the driver because of alcohol consumption, upon not fastening the seat belt, or with open doors of the vehicle.

The choice of the traveling speed in compliance with the prevailing circumstances at the time was previously effected by the driver on the basis of the traffic conditions which were observed by him, of the information concerning the vehicle itself which is placed available to him, as well as of possible pregiven fixed conditions, such as for example is provided by a seat belt logic circuit. Of disadvantage hereby is that the frequent information concerning doubtful, risky or indeed dangerous departures of the operating condition from the normal case is recognized too late by the driver or indeed basically not at all. The latter by the way is also the case when particular indicator systems are provided. Moreover it has been shown that the systems which should prevent placing the vehicle in operation under certain conditions and which generally cause an interruption of the ignition circuit at the ignition lock, frequently are turned off or switched inoperative by the interruption, in order in this manner to be able to place the vehicle in operation in spite of open doors, or other unfulfilled conditions.

These disadvantages are to be avoided by the invention in accordance with an object thereof. Starting out from the introductory-described device, in accordance with the invention this is achieved in that the actual value input or the desired value input of the controller (1) is driven or controlled by a circuit (11, 11'), the latter producing a signal for influencing the position of the throttle valve, which signal is dependent on one or more factors or quantities to be monitored. With such a device the throttle valve position, which is introduced by the driver via the gas pedal, is influenced by the factors to be monitored. Thus for example upon a lowering of the oil pressure in the motor, the throttle valve which is set by the driver to the wide open throttle position moves in the direction of idling, and in this manner damaging of the motor against shortages of oil is prevented. There results an automatic influencing of the traveling speed by the values or factors to be monitored, which traveling speed is selected by the driver based on the traffic conditions and the character of the road. In this manner it is guaranteed that departures of the working order or operating condition from the normal case are recognized immediately and corresponding counter measures are introduced, which are optimum, because they do not result via the driver and consequently subjectively. If the signal which is produced from the circuit comes from a seat belt logic circuit, an alcohol detector or a transmitter responsive to the opening of doors or another transmitter or detector indicating the fulfillment of predetermined conditions, thus the influencing of the throttle valve position can take place in that way thereby, that this position basically remains so long in its idling position until the transmitter and the circuits indicate a fulfillment of the set requirements. As long as these requirements are not fulfilled, an actuation of the regulating member and the gas pedal, respectively, does not lead to any pivoting of the throttle valve from out of its idling position. Turning off the monitoring system, as can be done with the known devices by connecting the ignition circuit at the ignition lock, with the device in accordance with the invention is not possible or so difficult, respectively, that this can only be undertaken with a considerable expenditure of time and with knowledge of the entire circuitry of the controller. A particular advantage of the invention resides in that it can be realized with only a small extra expenditure of components in a manner which is favorable in cost.

According to one embodiment of the invention the circuit (11) contains a control stage, and the output of the latter is connected with the desired value input of the controller (1) and its desired value input is applied by the signal from the regulating member (gas pedal) and its actual value input is applied with the signal which is dependent on the quantities to be monitored. It has been shown that the production of signals which are dependent on the factors or quantites to be monitored is possible with such a control stage with particularly low cost. Particularly in this manner in a simple manner the most different relationships between the throttle valve setting angle and the factors to be monitored may be produced.

According to another embodiment of the invention the circuit (e.g., 11') contains an AND gate (17), the inputs of which are applied with the quantities to be monitored and with the regulatory member signal, and the output of which is connected with the desired value input of the controller (1). Compared to the previously described construction such a circuit has still a simpler construction and permits the realization therefore with particularly low costs. Moreover with the installation of an AND gate with several inputs, without difficulties it can be adjusted to a different number of factors which are to be monitored.

According to one embodiment of the invention a circuit is provided which produces a signal dependent on the level condition of the cooling water. Upon lowering of the level of the cooling water under a certain level, thereby the throttle valve is adjusted in the sense of a rotational speed reduction of the motor and consequently to a lowering of the speed of the motor vehicle.

It is also advantageous to provide a circuit which produces a signal dependent on the temperature, on the pressure and/or on the quantity of the motor oil. This signal can influence the throttle valve position in the manner that upon the occurrence of an excess temperature, of too low a pressure or too low a quantity of motor oil, it pivots the throttle valve into its idling rotational speed or into another position which is associated with a low rotational speed range of the motor, in order to prevent damage to the motor.

According to a further concept of the invention a circuit is provided which produces a signal dependent on the working order or operating condition of the brake system. This signal, which for example is emitted by the circuit upon a lowering of the brake fluid or a reduction of the brake lining under a predetermined minimum value, leads to a pivoting of the throttle valve into its idling rotational speed, so that with too thin a brake lining or too low a liquid level, driving of the vehicle is possible only with the idling rpm of the motor, the vehicle thus, if at all, can be moved only very slowly.

According to a further concept of the invention a circuit is provided which produces a signal dependent on the orderly locking of the doors of the motor vehicle. With a door which is not closed according to regulations, the circuit drives or controls the actual value input or the desired value input of the controller such that a pivoting of the throttle valve from its position associated with the idle rotational speed into a position increasing the rotational speed is not possible upon actuation of the regulating member or gas pedal. A corresponding controlling can result by a circuit which produces a signal which is dependent on the position of the hand-brake. In the same manner a control or driving of the controller according to a further concept of the invention can occur by a circuit which produces a signal which is dependent on the output signal of an alcohol detector. Even here any pivoting of throttle valve from out of its idling position into another position is prevented as long as the breath of the driver contains elements signifying the consumption of alcoholic beverages.

It can also be advantageous to provide a circuit which produces a signal which is dependent on the output signal of a monitoring system (20) for the outside lights. This signal can provide an influencing of the controller in the manner that the throttle valve only swings by a certain pivot angle from out of its idling position and consequently the vehicle can be moved only with a predetermined small maximum speed. A similar controlling or driving of the controller can take place by a circuit which produces a signal that is dependent on the output signal of a seat belt logic circuit (19).

According to a further concept of the invention a circuit is provided which produces a signal that is dependent on the output signal of a noxious substance detector which is located in the exhaust system. If the exhaust system or a catalyzer which is possibly disposed in the exhaust system is damaged or consumed, respectively, or an erroneous adjustment leads to an increased noxious material output, thus the signal which is emitted from the circuit controls or drives the controller such that an actuation of the throttle valve is only possible in ranges in which the output of the noxious substances does not exceed a certain value.

Moreover it can be advantageous to provide a circuit which produces a signal dependent on the temperature of the motor. In this manner by the circuit, the controller is driven such that only after reaching of a certain minimum motor temperature can the throttle valve be pivoted over its entire angular range, thus only upon reaching a certain motor temperature, can the motor be brought to higher rotational speeds or to a lower idling rotational speed, respectively.

According to a further concept of the invention a circuit is provided which produces a signal limiting the traveling speed and/or the motor rotational speed to a value which is predetermined by the type of use of the vehicle.

According to one embodiment of the invention a circuit is provided which produces a signal limiting the traveling speed based on the use of special tires. As is known the permissible maximum speed of a motor vehicle also depends on its tires. For example, thus a motor vehicle with winter tires generally is not moved as fast as when it is equipped with summer tires. For a plurality of vehicles it is true that the permissible winter tires for these are allowed for a continuous speed of 150 km per hour. Exceeding this speed limit value leads to a strongly increased rubbing away of the tires, if not in fact to a detachment or removal of the protector or to a complete tearing or destruction of the tires. By the automatic limitation of the maximum traveling speed by the previously named circuit it is achieved that an overloading of the tires and consequently its damaging or indeed its destruction by unpermissably high traveling speeds is positively and surely prevented.

Also a circuit can be provided which produces a signal which limits the traveling speed based on the use of a trailer. Such a circuit has the object to limit the traveling speed of the vehicle to the legally permissible maximum value, which for example, with personal vehicles is established or fixed with a residential trailer at 80 kilometers per hour.

Moreover it can be advantageous to provide a circuit which produces a signal limiting the rpm of the motor to the maximum permissible value during the breaking in operation of the motor vehicle. By such a circuit it is guaranteed that a rotational speed excess which damages the motor cannot occur during the breaking in time.

A further advantageous embodiment deals with a circuit which produces a signal limiting the traveling speed after running or conclusion of a predetermined driving time. Such a circuit is particularly of importance in connection with trucks since in the field of truck traffic, there are regulations with respect to the span of time during which one driver may drive a vehicle. The monitoring of this regulation occurs generally by a self-registering speedometer or trip recorder, the installation of which in the truck is legally required; however in spite of this, violations of these regulations are always noted over and over again. With use of a circuit which produces the signal limiting the driving speed after termination of a predetermined driving time, the legally established rest times can be carried through in a simple manner.

According to a further concept of the invention a circuit is provided which produces a signal which is dependent on the sum of the outputs or power of all turned-on electrical consumers, embodied such that with an increasing current consumption or requirement the motor idling rpm increases.

By these measures it is achieved that the storage battery of the motor vehicle also with a plurality of current consumers is not loaded or is only insignificantly loaded, respectively, during the running of the motor and the entire current which is required by the consumers is supplied from the electric generator. In this manner it is guaranteed that the storage battery always has a sufficiently large capacity for the start up operation. This is particularly of importance in the winter months in which a multitude of electrical consumers (outer lights, heatable rear- and/or front-windows, additional heaters, heated seats, radio) frequently are turned on and the ignition operation generally must be repeated often until the motor runs.

The different above-described circuits can be used individually as well as also in combination.

Since under circumstances critical driver situations can occur if the throttle valve during driving suddenly is pivoted into its idle position, as this can occur with a number of the previously named circuits, according to a further concept of the invention, before influencing the throttle valve position, an acoustical and/or an optical alarm or warning signal is produced. For the same reasons it is recommended that at least for certain circuits there are provided switches (14) for switching operatively (on) and switching inoperatively (off), respectively, the circuits (11, 11'). By these measures the driver is warned, on the one hand, before the positively constrained, controlled pivoting of the throttle valve and on the other hand he has the possibility, to make his vehicle drivable again by turning off the circuit which causes the pivoting of the throttle valve into its idle position, insofar as the driver can drive the vehicle out of a danger zone.

According to a further concept of the invention for the operative switching-on or inoperative switching-off, respectively, of the circuits, advantageously a switch is provided which is actuatable by means of a complete pivoting of the regulating member (9, 10). An alternative to this according to a further concept of the invention is that the switch is substituted by a switching circuit which detects the changing speed of the signal emitted from the regulating member and upon exceeding a predetermined changing speed, performs a switching operation. In the first mentioned case the operative switching on and the inoperative switching off, respectively, of the current circuit or current circuits, respectively, takes place by completely stepping down on the gas pedal, and in the other case by quickly stepping down on the gas pedal.

With a circuit which produces a signal which is dependent on the sum of the outputs of all turned-on electrical consumers, it has shown advantageous to provide the switch as a threshold value switch (26), which upon exceeding of a predetermined minimum current consumption or requirement operatively turns or switches the circuit on and upon lowering of the current consumption or requirement under the minimum current consumption or requirement switches the circuit (11) off.

Likewise it is also possible to provide a manual switch which is actuated by the vehicle driver when the latter recognizes that the current consumption or requirement of the turned-on consumers is no longer covered alone by the electric generator, but rather also by the storage battery.

It has been shown as purposeful to form each circuit as a construction unit or module which is detachably connected with the electric controller. In this manner the possibility exists to be able to exchange or replace with respect to one another individual circuits according to need. Particularly with circuits which produce a signal which limits the rotational speed of the motor to a maximum value which is permissible during the breaking-in operation, or which limits the traveling speed after termination of a predetermined driving time, it has also been shown advantageous to form the releaseable connection sealable in order to prevent an unpermitted or unallowed removal of this circuit from the controller.

With the above and other objects and advantages in view, the present invention will become more clearly understood in connection with the detailed description of preferred embodiments, when considered with the accompanying drawings, of which:

Figure 1:
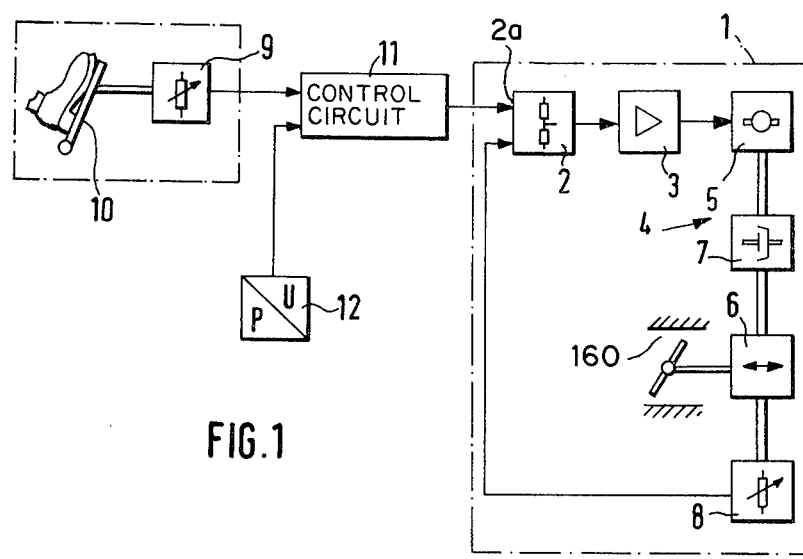
FIG. 1 is a block circuit diagram of a device in accordance with the present invention.
Figure 2:
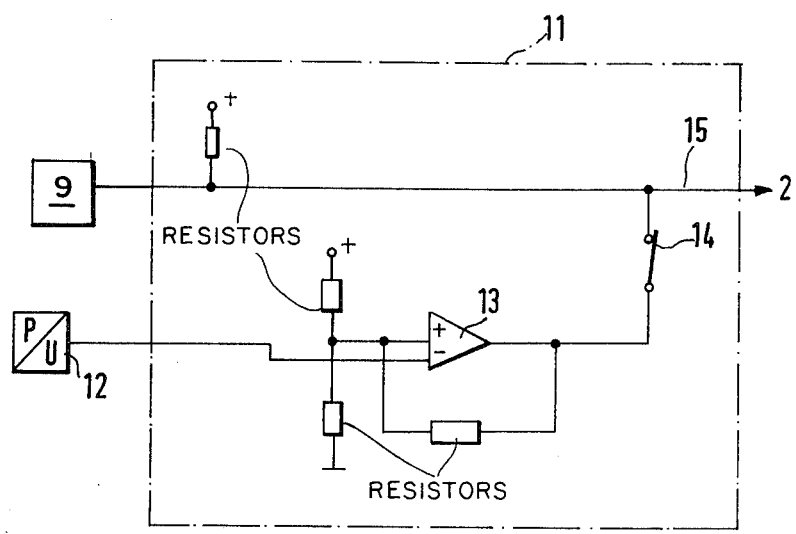
FIG. 2 is a simplified circuit diagram of a circuit of the controller in accordance with the invention.

Referring now to the drawings, and particularly to FIGS. 1 and 2, the arrangement comprises an electrical controller 1 which comprises essentially a comparator 2, an amplifier 3 connected following the comparator in series and a setting device 4, the latter comprising an electric servomotor 5, a positioning actuator 6, and an electromagnetic coupling 7 operatively connected between the last two mentioned units. The actuator 6 is connected to the throttle valve 160 for setting the latter. The controller 1 furthermore contains a position indicator 8 which is connected to the positioning actuator 6, the position indicator 8 transmitting a voltage which is proportional to the instantaneous position of the position indicator 8 to one of the inputs of the comparator 2. At the other input of the comparator 2 (which comparator for example can be constructed of a series connection of two resistors which are acted on at their free ends with the signals to be compared and the interconnected or joined ends thereof form the comparator output), there is normally located the position indicator 9, the latter being formed as a variable resistor and being coupled with the gas pedal 10 (i.e., the regulating means which is actuatable by the driver) of the motor vehicle.

With the device in accordance with the invention, however, the position indicator 9 is connected with the desired-value input of a control circuit 11 which is formed as a regulating or control stage, the output of which circuit is connected with the input 2a of the comparator 2. A transmitter 12 is connected to the actual value input of the circuit 11, the latter being formed as a regulator or controller. The transmitter 12 is associated with and operatively coordinated to a factor or quantity to be monitored, here in this example the oil pressure in the motor, and transmits a voltage signal which is a function thereon. Via the line 15 in the control circuit 11, the position indicator 9 is connected to the desired value input of the comparator 2 and the controller 1, respectively.

In order to explain the basic manner of operation of the device, let us assume that the gas pedal 10 is in its position of rest and the motor is rotating at idling speed. The throttle valve 160 is then in its idling position and both inputs of the comparator 2 are applied with signals which correspond to the prevailing equilibrium. If the gas pedal 10 is now pivoted by a certain angle by the driver, the position indicator 9 gives off a higher voltage signal to the comparator 2 and the comparator 2 drives the servomotor 5. The latter via the positioning actuator 6 pivots the throttle valve 160 in such a direction as to increase the speed of the rotation of the motor. The change in position of the positioning actuator 6 results in a change in the output signal of the position indicator 8, as a result of which the voltage at the other input of the comparator 2 increases.

In the present case the transmitter 12 is a pressure transducer, which as evident from FIG. 2, is connected to one of the inputs of a differential amplifier 13. The other input of the differential amplifier 13 is applied with a reference voltage being connected to the junction of two resistors (unnumbered but labeled), while its output stands in connection with the line 15 via a switch 14. The line 15 connects the position indicator 9 with said one input 2a of the comparator 2. If the oil pressure is in proper order, there is no influencing of the signal which is emitted from the desired value transmitter 9 to the comparator 2 and the above-described basic operation occurs. In other cases, however, that is, if the oil pressure drops under a certain predetermined value, the potential at the desired value input 2a of the controller 1 is reduced by the differential amplifier 13, and indeed such that the throttle valve 160 can now only be pivoted to a rotational speed range which is limited at the top. The switch 14 is normally closed and can be manually actuated, that means it can be opened, in case the oil pressure drops so much that upon actuation of the position indicator 9, no higher rotational speed than the idling rotational speed can be obtained.

Figure 3:
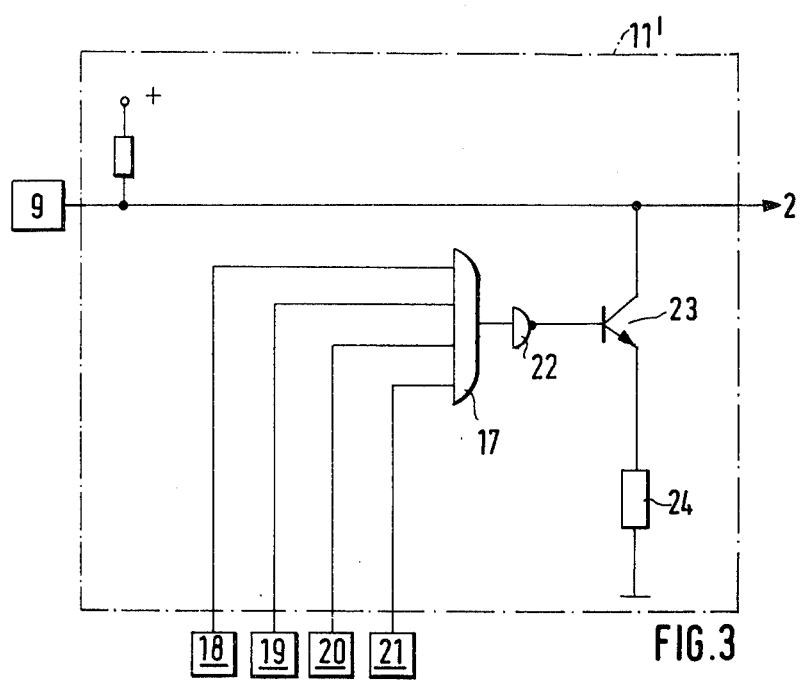
FIG. 3 is a simplified circuit diagram of another circuit in accordance with the present invention.

The circuit 11′ illustrated in FIG. 3 contains an AND gate 17 with several inputs, to which there are connected an alcohol detector 18, a seat belt logic circuit 19, a monitoring circuit 20 for the exterior lights and a door locking monitoring circuit 21. The output of the AND gate 17, via a NOT element or inverter 22, drives the transistor 23 which is grounded through a resistor 24.

By means of the emitter-collector path of the transistor 23 and a fixed resistor 24, the connection line 15 between the position indicator 9 and the comparator 2 can be pulled down to a potential, which corresponds to the idling rotational speed of the motor. If all conditions of the AND gate are fulfilled, that is, the doors are closed, the outer lights are in order, the belt is fastened and no alcohol can be determined from the driver, the sensors and circuits 18, 19, 20 and 21 each respectively emit a positive signal to the AND gate 17 and this gate 17 emits a positive output signal to the NOT element 22, the latter with its "low" signal driving the transistor into the locking direction. However as soon as one of the sensors or circuits 18 to 21 emits another signal, because, for example, the outer lights are not in order, the output signal of the AND gate 17 changes and at the output of the inverter 22 there appears a "high" signal. By means of this "high" signal the transistor is switched into its passage or conducting condition direction. In this manner the potential on the line 15 is pulled down to a value corresponding to the idling rotational speed.

Figure 4:
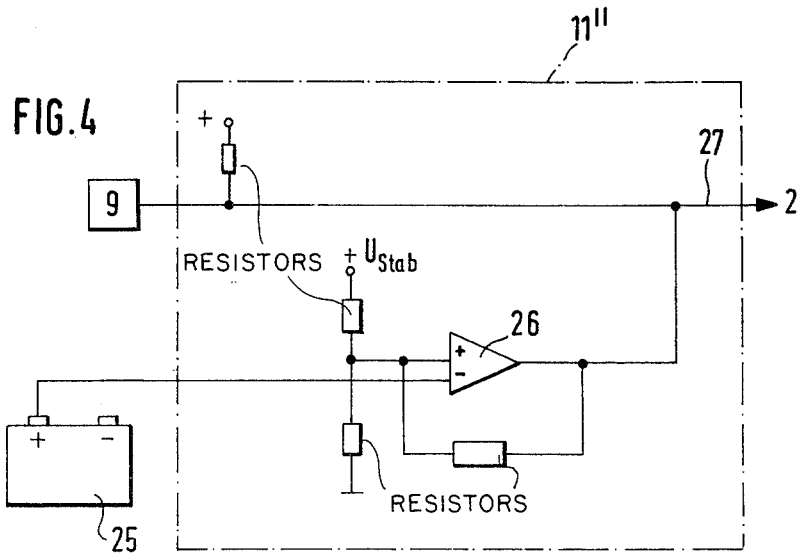
FIG. 4 is a simplified circuit diagram of another circuit in accordance with the invention.

The circuit 11″ illustrated in FIG. 4 produces a signal which is dependent on the sum of the outputs of all turned-on electrical consumers, which signal upon an increasing current consumption or requirement, increases the motor idling rotational speed. The circuit 11″ is connected to the plus pole of the storage battery 25 of the motor vehicle on its actual value input. Like the circuit according to FIG. 2, the circuit 11″ of FIG. 4 has a differential amplifier 26, one input of which is applied with a stabilized reference voltage and its other input is connected to the plus pole of the storage battery 25. The output of the differential amplifier 26 is connected to the line 27 which connects the position indicator 9 with the input 2a of the comparator 2.

Below a certain minimum current consumption or requirement, that is, if the battery voltage lies above the value given by the reference voltage, there is no influence on the signal which is emitted by the desired value position indicator 9 to the comparator 2. However as soon as the current consumption rises above the minimum current consumption or requirement and consequently the battery voltage falls under the value given by the reference voltage, the potential at the desired value input 2a of the controller is influenced by the differential amplifier 26 such that the throttle valve 160 is pivoted into a rotational speed-increasing position. This pivoting is larger the greater the voltage of the storage battery drops, that is, the larger the current consumption or requirement of the supply mains.

Figure 5:
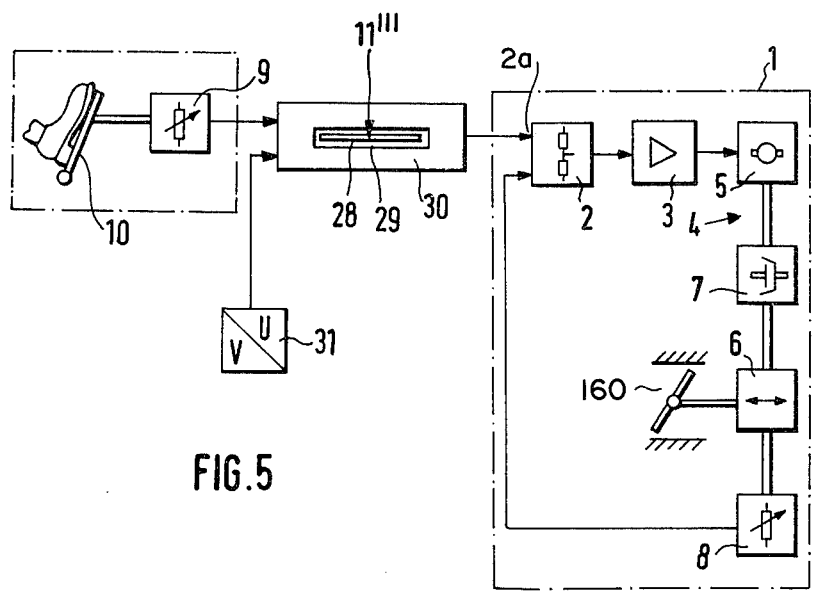
FIG. 5 is a block circuit diagram of a device with a controller which is formed for the detachable reception of current circuits.
Figure 6:
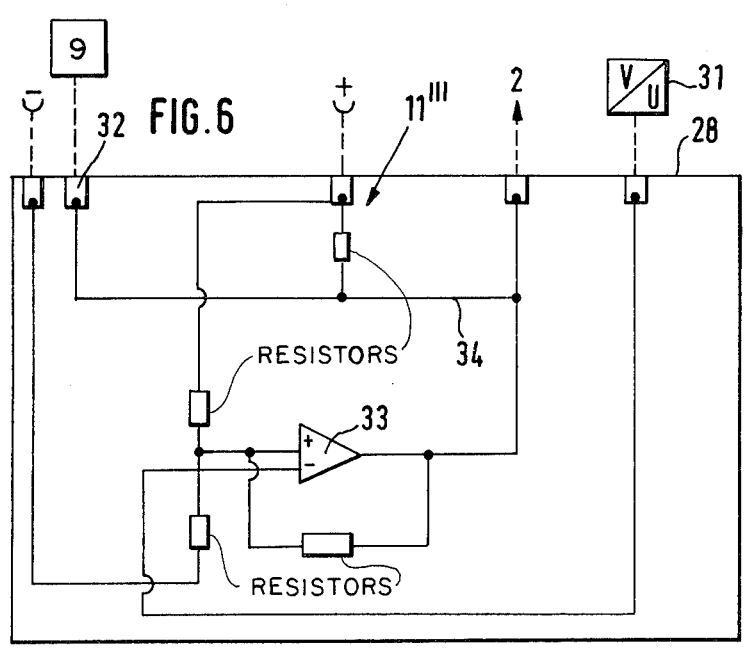
FIG. 6 is a pluggable printed circuit board for the device according to FIG. 5.

With the device according to FIGS. 5 and 6 the circuit 11‴ is disposed on a printed circuit board 28, the latter being able to be inserted or plugged into a slot 29 of a housing 30. The position indicator 9, the comparator 2 and a transmitter 31 are connected to the housing 30, transmitter is associated with and coordinated to the driving speed and emits a voltage signal dependent on the driving speed. Several contact springs are located in the housing 30, which springs go into contact with the connection positions 32 on the printed circuit plate 28 when the printed circuit plate 28 is plugged into the slot 29.

In the plugged-in condition of the printed circuit plate 28, the transmitter 31 is connected to one input of a differential amplifier 33. The other input of the differential amplifier 33 receives a reference voltage, while its output is connected with the line 34, the line 34 connecting the position indicator 9 with the input 2a of the comparator 2. If the driving speed lies under a certain predetermined value—in case the circuit 11‴ is associated with winter tires, this value, for example, amounts to 140 kilometers per hour—, thus there occurs no influencing of the signal which is sent by the position indicator 9 to the comparator 2. However in other cases, that is, if the previously-mentioned speed value is reached, the potential at the desired value input 2a of the controller is reduced by the differential amplifier 33, and indeed in a manner such that the throttle valve 160 can not be pivoted over the position of the throttle valve corresponding to the highest speed value.

While there have been disclosed several embodiments of the invention, it is to be understood that these embodiments are given by example only and not in a limiting sense.

We claim:

1. In a device for the control of the traveling speed of a motor vehicle with a gas pedal actuatable by the vehicle driver, the gas pedal producing an electrical signal emitted to the desired value input of an electrical controller, the output signal of which acts on a positioning actuator, the latter being coupled with an element, particularly the throttle valve of the engine of the vehicle, which influences the fuel-air mixture, the instantaneous setting position of the positioning actuator being transmitted as an electric signal to the actual value input of the electrical controller, the improvement comprising circuit means for driving one of the inputs of the electrical controller, said circuit means for producing a signal for operatively influencing the position of the throttle valve, said latter-mentioned signal is dependent on at least one factor to be monitored, said circuit means contains, a control stage, said control stage has a desired value input, an actual value input, and an output, said output of said control stage is connected with the desired value input of the electrical controller and said desired value input of said control stage is fed with the electrical signal produced by said gas pedal, said actual value input of said control stage is applied with said signal which is dependent on the at least one factor to be monitored, and switches means for switching on and switching off, respectively, said circuit means, said switch means is actuatable by complete pivoting of said gas pedal.

2. The device as set forth in claim 1, wherein said circuit means includes an AND gate having a plurality of inputs applied with the factors to be monitored and an output connected with said desired value input of said controller.

3. The device as set forth in claim 1, wherein said circuit means produces said signal dependent on the level of cooling water.

4. The device as set forth in claim 1, wherein said circuit means produces said signal dependent on a temperature, pressure and/or quantity of motor oil.

5. The device as set forth in claim 1, wherein said circuit means produces the signal dependent on a working order of a vehicle brake system.

6. The device as set forth in claim 1, wherein said circuit means produces the signal dependent on a proper locking of the doors of the motor vehicle.

7. The device as set forth in claim 1, wherein said circuit means produces the signal which is dependent on position of the hand-brake.

8. The device as set forth in claim 1, wherein said circuit means produces the signal which is dependent on an output signal of an alcohol detector.

9. The device as set forth in claim 1, wherein said circuit means produces the signal which is dependent on the output signal of a monitoring system of the outside lights.

10. The device as set forth in claim 1, wherein said circuit means produces the signal dependent on an output signal of a seat belt logic circuit.

11. The device as set forth in claim 1, wherein said circuit means produces the signal dependent on an output signal of a noxious substance sensor located in an exhaust system.

12. The device as set forth in claim 1, wherein said circuit means produces the signal dependent on the temperature of the motor.

13. The device as set forth in claim 1, wherein said circuit means produces the signal limiting the traveling speed and/or motor rotational speed to a value predetermined by the type of use of the vehicle.

14. The device as set forth in claim 13, wherein said circuit means produces the signal limiting the traveling speed based on the use of special tires.

15. The device as set forth in claim 13, wherein said circuit means produced the signal limiting the traveling speed based on the use of a trailer.

16. The device as set forth in claim 13, wherein said circuit means produces the signal limiting the rotational speed of the motor to a maximum permissible value during a breaking-in operation of the vehicle.

17. The device as set forth in claim 1, wherein said circuit means produces the signal limiting the traveling speed after termination of a predetermined traveling time.

18. The device as set forth in claim 1, wherein said circuit means produces the signal dependent on the sum of the outputs of all turned-on electrical consumers such that with an increasing current consumption the idling rotational speed of the motor increases.

19. The device as set forth in claim 1, further comprising means for producing an acoustical and/or an optical warning signal before influencing the throttle valve position.

* * * * *

UNITED STATES PATENT AND TRADEMARK OFFICE
CERTIFICATE OF CORRECTION

PATENT NO. : 4,319,658
DATED : March 16, 1982
INVENTOR(S) : Harald Collonia et al It is certified that error appears in the above-identified patent and that said Letters Patent are hereby corrected as shown below:

Column 9, (Claim 1) Line 34 "switches" should read
--switch--

Column 10, (Claim 15) Line 32 "produced" should read
--produces--

Signed and Sealed this

Twenty-fifth Day of May 1982

[SEAL]

Attest:

Attesting Officer

GERALD J. MOSSINGHOFF
Commissioner of Patents and Trademarks